United States Patent [19]
Goodwin

[11] Patent Number: 5,893,335
[45] Date of Patent: Apr. 13, 1999

[54] BIRD FEEDER PAVILION

[76] Inventor: Alana B. Goodwin, 45 Deforest Rd., Newton Lower Falls, Mass. 02162

[21] Appl. No.: 08/978,536

[22] Filed: Nov. 26, 1997

[51] Int. Cl.[6] ............................................... A01K 39/00
[52] U.S. Cl. ............................................ 119/52.2; 119/57.9
[58] Field of Search .................................. 119/52.3, 52.2, 119/57.8, 57.9, 428, 429; 52/80.1; 264/32

[56] References Cited

U.S. PATENT DOCUMENTS

| | | | |
|---|---|---|---|
| 3,801,685 | 4/1974 | Bell, Jr. | 52/80.5 |
| 3,977,363 | 8/1976 | Fisher, Jr. | 119/52.3 |
| 4,031,856 | 6/1977 | Chester | 119/57.9 |
| 4,102,308 | 7/1978 | Kilham | 119/52.3 |
| 4,389,975 | 6/1983 | Fisher, Jr. | 119/52.3 |
| 4,441,457 | 4/1984 | Sanford | 119/57.9 |
| 4,826,639 | 5/1989 | Vidal et al. | 264/32 |
| 5,195,460 | 3/1993 | Loken | 119/57.9 |
| 5,207,180 | 5/1993 | Graham | 119/52.3 |
| 5,291,855 | 3/1994 | Laverty | 119/52.3 |
| 5,293,835 | 3/1994 | Shagoury | 119/57.9 |
| 5,309,867 | 5/1994 | Cruz | 119/52.3 |
| 5,341,610 | 8/1994 | Moss | 52/80.1 |
| 5,699,752 | 12/1997 | Wilkins | 119/57.8 |

*Primary Examiner*—Michael J. Carone
*Assistant Examiner*—Elizabeth Shaw
*Attorney, Agent, or Firm*—D. Michael Burns

[57] ABSTRACT

The pavilion provides both shelter and a food supply for birds of various species. It is a squirrel-proof construction that relies upon a combination of geometric configurations and support posts made of polyvinyl chloride. The support posts are maintained in a highly polished condition which prevents their being scaled by any squirrel or similar small animal. The structure comprises four tubular posts which are embedded in the ground and are connected together by horizontal tubular cross members which are used to suspend a plurality of bird feeders. A large dome covers the pavilion giving shelter to the birds and the bird food.

16 Claims, 2 Drawing Sheets

BIRD FEEDER PAVILION

BACKGROUND OF THE INVENTION

1. Field of the Invention

The present invention relates generally to a bird feeder pavilion which is designed as a deterrent to squirrels raiding the bird food. The present invention also relates to a pavilion that will provide protection from the elements for both the birds and the bird food. The present invention further relates to a pavilion that has intrinsic esthetic qualities.

2. Description of the Prior Art

The present invention fills a long felt need for a squirrel-proof bird shelter which will save bird food for the birds only. Squirrel-proof methods for protecting bird feeders are known. Most wild bird and garden supply stores stock devices that attempt to solve this problem. However, the problem continues to exist and the squirrels continue to flourish despite some very creative inventions. The methods available to owners of bird feeders usually have a common denominator, that being some form of mechanical barrier such as a baffle. A singular post is most often used to support the structure. Recently, a two hour documentary appeared on television's Discovery Channel which focused entirely on the resourcefulness of squirrels, and a portion of the program specifically showed the efforts they will take to get at bird feeders. One example showed how a squirrel can leap five feet in the air to get at a feeder.

U.S. Pat. No. 5,291,855 issued to Ralph E. Laverty on Mar. 8, 1994, describes a bird feeder that is supported on a singular post and addresses the problem of preventing a squirrel or some similar ground animal from reaching the feeder. Laverty discloses a means consisting of a tubular skirt which is a familiar baffle type arrangement. The present invention teaches a more stable arrangement (four posts instead of only one) and shows the use of polyvinyl chloride to deter the natural tendency of the rodent to gnaw on the post. Experience shows that squirrels will chew on a post in order to be able to get a foothold.

U.S. Pat. No. 4,441,457 issued to Doyle M. Sanford on Apr. 10, 1984, teaches a bird feeder stand that will accommodate all types of feeders and planters. The feeders are hung from cantilevered arms and supported by brackets attached to the bottom of the feeder. Sanford primarily discloses a stand that is portable and anchored by an automobile wheel. The present invention, while accommodating multiple bird feeders, teaches a remedy for preventing squirrels from reaching the bird food by utilizing a combination of height and space.

U.S. Pat. No. 4,389,975 issued to James B. Fisher, Jr. on Jun. 28, 1983, discloses a dual purpose bird feeder which can be mounted upon a single post and uses the traditional baffling means. These baffles rely on placing a barrier with angles that make it unscalable. Again, the present invention does not use a baffle, but rather relies on a sleek and highly polished post system to keep the squirrels on the ground.

U.S. Pat. No. 5,309,867 issued to Julio V. Cruz on May 10, 1994 takes a squirrel-proof feeder device that utilizes mechanical parts. Cruz teaches the use of locking devices and roof hinges, flanges and weight detecting devices. The present invention requires none of these moving parts and relies solely on a very simple structure which relies on geometric configurations.

U.S. Pat. No. 5,195,460 issued to Selmer M. Loken on Mar. 23, 1993, teaches the use of rigid tubular shaped pipes as cross members to support multiple feeders, and he also discloses the use of a singular tubular post for supporting the structure. He also discloses the use of polyvinyl chloride material. The present invention recognizes the necessity for the polyvinyl chloride tubes being kept extremely sleek with regular polishing. Also the present invention uses a four cornered arrangement to introduce the element of wide open space as a squirrel barrier and thus eliminates the need of any kind of baffling arrangement.

U.S. Pat. No. 4,031,856 issued to Russell L. Chester on Jun. 28, 1977, teaches the use of a mechanical sleeve that prevents squirrel infiltration by a pulley/counterweight mechanism. Variations of this technique are commonly used today. Again the present invention accomplishes this desired end result without having to use any moving parts, and this is important because moving parts are subject to maintenance problems such as rusting and aging. None of the above inventions, taken either singularly or in combination, are seen to describe the instant invention.

SUMMARY OF THE INVENTION

The invention is a squirrel-proof bird feeder pavilion that is designed for the support of multiple feeders and is a permanent fixture in the preferred embodiment.

The invention includes a pavilion made from tubular polyvinyl chloride pipe. The present inventor has learned that this material is a definite deterrent against the gnawing of rodents. The pavilion is constructed from four vertical posts which are at a height of 8.5 feet at the top position. This is necessary to prevent the squirrels from leaping up to the feeders. It is also necessary to keep these posts highly polished or else the squirrels will find a way to scale them. Automobile polish works extremely well. The post members are all connected to each other by horizontal tubular support members and interconnecting fittings. All these parts are made of polyvinyl chloride material. The preferred embodiment uses an aluminum dome to give both shelter to the birds as well as to keep the bird food dry. The four cross members at the top afford the opportunity to handle a plurality of feeders. The entire bottom of the pavilion is embedded into the ground to a depth of about one foot.

Accordingly, it is a principal object of the invention to provide a bird pavilion which will be squirrel-proof.

It is another object to provide shelter for the birds and their food.

It is a further object to provide an esthetically pleasing structure, one that could be permanently and proudly displayed by a homeowner.

It is still another object of the invention to provide a means for supporting a plurality of bird feeders.

And yet another object of the invention is to provide a sturdy structure that will enhance and expand the pleasure of bird feeding to year-round, and in all types of weather.

It is another object to be have a structure with no moving parts and that requires very little mechanical ability to assemble and install.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
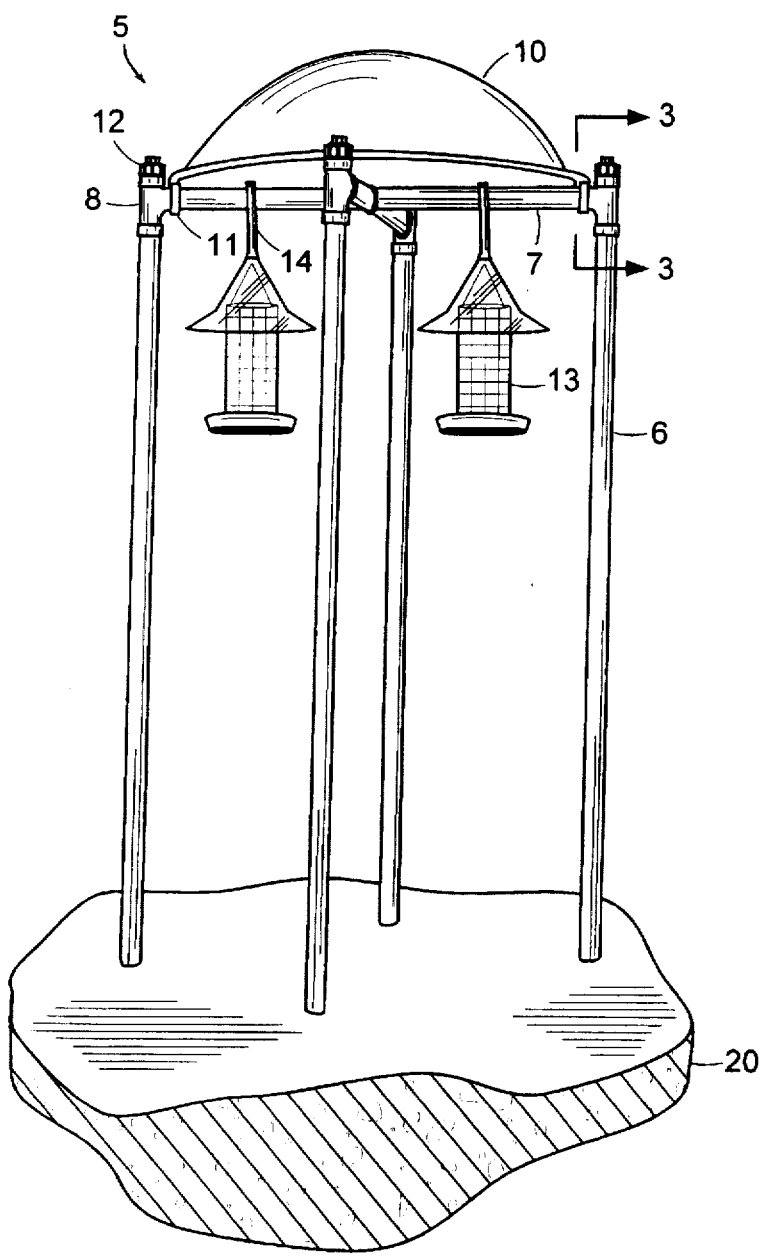
FIG. 1 is an environmental perspective view of the pavilion as it looks when firmly embedded in the ground. Bird feeders are shown suspended by plastic coated chains and S-shaped hooks.
Figure 3:
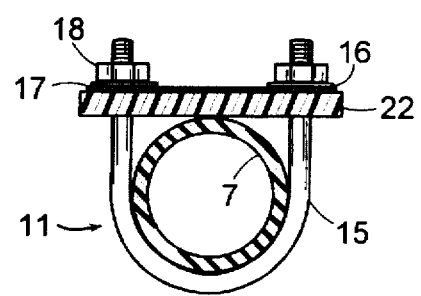
FIG. 3 is cross sectional along 3—3 of FIG. 1, of the galvanized U-bolt assembly consisting of U-bolt, plate, washers and nuts as it connects the dome to pavilion.
Figure 2:
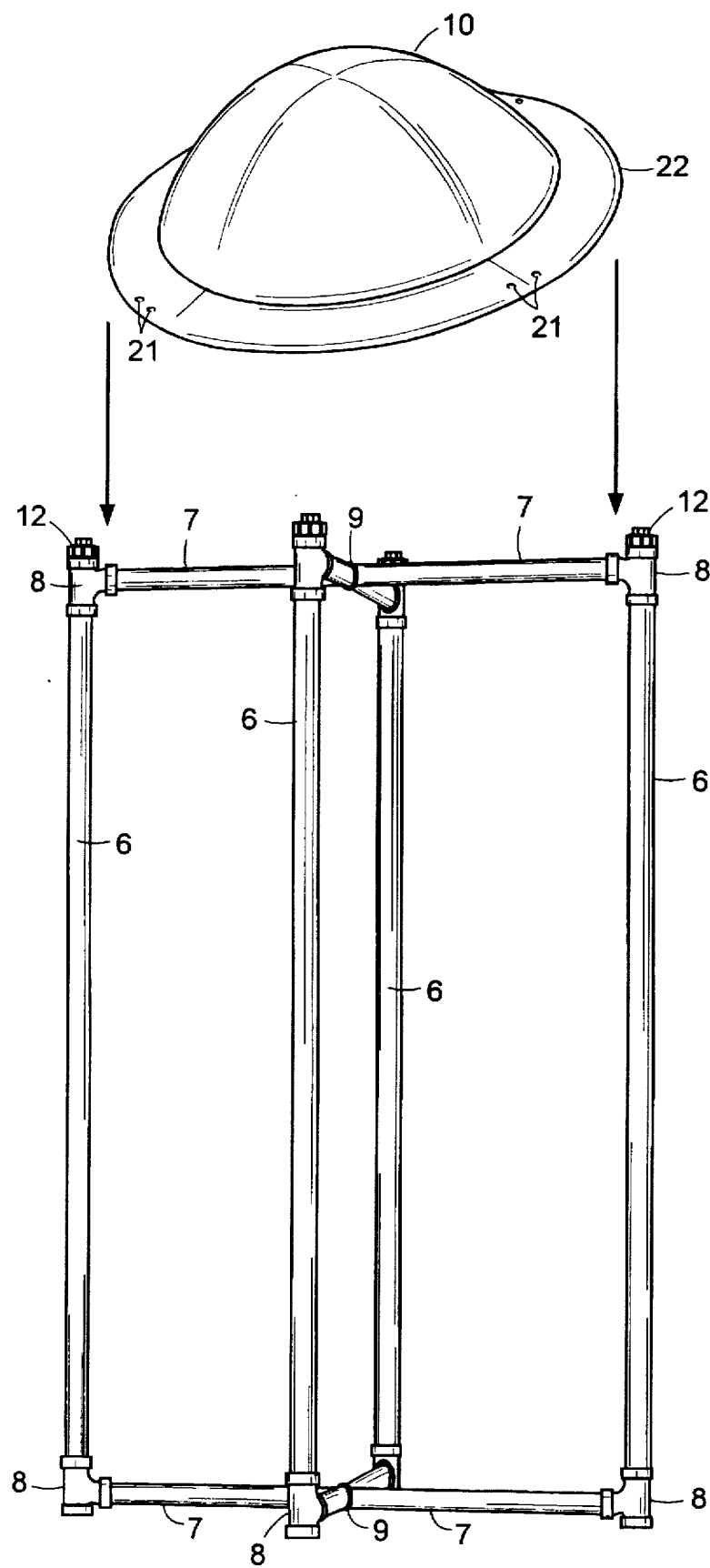
FIG. 2 is an elevational view of the polyvinyl chloride tubing structure removed from the ground and without the dome covering.

Referring to the drawings, the invention provides for a vertically standing pavilion 5 that is squirrel-proof and offers shelter and food for birds. The pavilion 5 includes four vertical and substantially parallel tubular support posts 6. The pavilion 5 further includes, at each of the top and bottom ends of the support posts 6, four lateral interconnecting tubular cross members 7. The cross members 7 are perpendicularly disposed within the posts 6 and each such cross member 7 has an inner end adhesively engaged with a four-way tubular fitting 9 thus connecting all cross members 7 to each other, and having the outer ends of the cross members adhesively connected to the support posts 6 with three-way tubular fittings 8. The cross members adjacent to the top of the support posts forming the upper cross member group and the corresponding cross members at the bottom posts forming the lower cross member group. FIG. 1 shows the pavilion 5 having a dome 10 mounted thereon. In the preferred embodiment, the dome 10 is shown in FIG. 2 to include an integral brim 22 that extends concentrically around the periphery of the dome 10, the brim 22 further having four pairs of holes defined at equidistant intervals. The dome 10 is attached to each of the upper cross members 7 with a U-bolt assembly 11. The dome is further supported by four tubular finials 12, which are adhesively connected to the upper ends of the support posts 6 by the three-way fittings 8. Whereas the finials 12 provide some measure of support for the dome 10, they have a definite intrinsic esthetic value. The U-bolt assembly 11 is shown on FIG. 3 to include a U-bolt 15 which overlaps the cross member 7 and has two legs, each projecting through one of the pairs of holes 21 in the brim 22. They further serve to tighten the connection by using a pair of circular washers 17 and a relatively rectangular shaped plate 16 that has a pair of apertures defined within the surface, all of which are secured by a pair of nuts 18. The washers 17 should be constructed from such materials as rubber or nylon so as not to scratch the dome 10. The U-bolts 15, the plates 16 and nuts 18 should all be galvanized. FIG. 1 shows the pavilion 5 embedded into the substrate 20 which would be the ground in the preferred embodiment. FIG. 1 depicts a couple of bird feeders 13 which are suspended from the cross members 7 by a chain and S-hook 14 arrangement. These chain and S-hooks are to be plastic coated. The present invention assumes that numerous bird feeders 13 can be and will be suspended from the pavilion 5 at any one time. It will be noted in FIG. 2, that the lower structure of the pavilion 5 is nearly identical with the upper part, the only difference being that there are finials only on the top ends of the posts.

The support posts 6, the tubular cross members 7, the four-way fittings 9, the three-way fittings 8, and the finials 12 are all made from polyvinyl chloride (PVC) material. When securing the tubular posts and cross members it is recommended that an adhesive be used within the connections for a tighter and more secure fitting. The main embodiment would be to maintain the posts 6 in a highly polished condition, similar to that which would be obtained by using a common automobile type wax. The height of the support posts 7 should be about 8.5 feet. The posts 6 should be embedded into the ground 20 approximately one foot. This will insure enough stability and ruggedness in all weather conditions. The chain and S-hook 14, that hold the bird feeders 13 while suspended from the cross support members 7, are to have a plastic coating. The dome 10 can be constructed from a variety of materials such as aluminum, fiberglass or even plastic. In the preferred embodiment the dome 10 should be aluminum, as trial and error has proven it to be superior where strength is necessary to withstand the weight of piling snow and where stability is required to withstand high winds. The overall diameter of the dome 10, measured from the outer edges of the brim 22, is anticipated to be 49 inches. The height of the dome 10 will be just under 15 inches (14.75"). This pavilion 5 could be marketed as a kit and one of the optional items for the consumer to choose from will be a variety of esthetically painted dome designs. All the other elements in the kit will be white in color. While it is realized that other colors can be available, it is recommended that since the pavilion 5 is designed to be installed outdoors, and since the material for the structure will be PVC, then the color should be white. Manufacturing PVC in colors requires the addition of unwanted fillers to be put into the resin, and these fillers will cause blotching from exposure to ultraviolet rays of the sun.

It is to be understood that the present invention is not limited to the sole embodiment described above, but encompasses any and all embodiments within the scope of the following claims.

I claim:

1. A pavilion for holding at least one bird feeder, said pavilion comprising:

a plurality of generally parallel, rigid, highly polished, tubular support posts, each having a top end and an opposite bottom end, said top end being extended vertically upward;

a plurality of tubular cross members positioned within the perimeter and perpendicular to said posts, one plurality of cross members being located at said top end of post, another plurality of cross members being located at said bottom end of said posts, said cross members, each having opposing ends, an inner end and an outer end, said inner ends capable of being coupled together by an interconnecting means, said outer ends firmly engaged with said ends of said support posts, said upper cross members providing for vertical suspension of said at least one bird feeder;

a plurality of finial members, each said finial member having an ornamental portion and an insertable portion, said finials firmly engaging with said top ends of said support posts; and a dome positioned above and having mounting means to mount said dome to said upper cross members, said dome comprising an integral brim portion extending generally concentrically about a periphery of said dome, said brim having disposed therein a plurality pair of holes equidistantly spaced about said brim, said dome providing weather protection for birds and bird food.

2. The pavilion of claim 1, wherein said plurality of support posts, said plurality of upper cross members, said plurality of lower cross members, said plurality of finials, and said plurality of pair of holes in said brim being four in number.

3. The pavilion of claim 2, wherein said support posts, said cross members, said finials and said connecting fittings being made from polyvinyl chloride material.

4. The pavilion of claim 3, wherein said interconnecting means for coupling said inner ends of said cross members being tubular, four-way fittings, each said fitting having four sleeves contained therein, one sleeve accepting each said inner end of said cross members.

5. The pavilion of claim 4, wherein said top and bottom ends of said support posts being in firm engagement with said outer end of said upper and lower cross members repectively with tubular, three-way fittings, said three-way fittings also firmly engaging said insertable portions of said finials, said three-way fittings having sleeve openings defined for accepting said outer cross member ends, said top and bottom support posts and said insertion end of said finials.

6. The pavilion of claim 5, wherein said four-way fittings and said three-way fittings have an adhesive inserted within said sleeve openings for achieving a tighter fastening.

7. The pavilion of claim 1, wherein said mounting means comprises:
- a galvanized U-bolt, said U-bolt having a rounded part dimensioned such as to fit around said cross member, said U-bolt further having legs in alignment with and extending through said pair of holes of said dome,
- a pair of rubber washers for protecting the surface finish of said dome;
- a galvanized plate having a pair of apertures which are aligned with said pair of holes of said dome; and
- two galvanized nuts for tightening and securing said dome to said upper cross members.

8. The pavilion of claim 7, wherein the washers are made from nylon material.

9. The pavilion of claim 1, wherein said at least one bird feeder is supported by a plastic coated chain and S-hook arrangement.

10. The pavilion of claim 1, wherein said dome is made from aluminum material.

11. The pavilion of claim 10, wherein said dome measures 49 inches in diameter when measured from the outer edges of said brim.

12. The pavilion of claim 11, wherein said dome is 14.75 inches high.

13. The pavilion of claim 1, wherein said support posts are 8.5 feet long.

14. The pavilion of claim 13 wherein said support posts are embedded in ground at least a minimum of one foot.

15. A pavilion for holding at least one bird feeder, said pavilion comprising:

- four parallel, rigid, highly polished, tubular, polyvinyl chloride support posts, each said post having opposing ends, a top end and a bottom end, said top end extending vertically upwards 8.5 feet;
- two cross member groups, an upper and a lower group, each group comprising four tubular, rigid, polyvinyl chloride cross members, each said cross member having opposing ends, an inner end and an outer end;
- four-way tubular polyvinyl chloride interconnecting fittings, each having four sleeves therein, said sleeves having inner surfaces defining openings for adhesively accepting said inner ends of said cross members;
- three-way tubular polyvinyl chloride fittings, each having three sleeves therein, said sleeves having inner surfaces defining openings for adhesively accepting said outer ends of said cross members with said ends of said posts;
- four finial members, each comprising an ornamental portion and an insertable portion, said insertable portion adhesively engaging within said sleeve of said three-way fitting at said top end of said posts;
- a dome positioned above and being mounted to said cross member group, said dome including a brim portion extending generally concentrically about said dome periphery, said brim having disposed therein four pairs of holes, said pair of holes equidistantly spaced about said brim; and
- four U-bolt assemblies, each comprising,
  (i) a galvanized U-bolt, said U-bolt having a rounded part dimensioned such as to fit around said cross member, said U-bolt further having legs in alignment with and extending through said pair of holes in said brim,
  (ii) a pair of rubber washers for protecting the surface finish of said dome,
  (iii) a galvanized plate, said plate having one generally rectangualar surface in parallel contact with said rubber washers, said plate having a pair of apertures defined therein, said apertures being in axial alignment with said pair of holes in said dome, and
  (iv) a pair of galvanized nuts for securing said dome to said cross members.

16. The pavilion of claim 15 wherein said washers are made from nylon material.

* * * * *